United States Patent [19]
Simonelli et al.

[11] Patent Number: 5,260,864
[45] Date of Patent: Nov. 9, 1993

[54] CONFIGURABLE INVERTER FOR 120 VAC OR 240 VAC OUTPUT

[75] Inventors: James M. Simonelli, Grafton; Zeljko Arbanas, Springfield, both of Mass.

[73] Assignee: Digital Equipment Corporation, Maynard, Mass.

[21] Appl. No.: 896,712

[22] Filed: Jun. 10, 1992

[51] Int. Cl.$^5$ ............................................. H02M 7/04
[52] U.S. Cl. ........................................ 363/143; 323/299
[58] Field of Search ................ 363/132, 143, 17, 21, 363/98; 323/234, 299

[56] References Cited

U.S. PATENT DOCUMENTS

| | | | |
|---|---|---|---|
| 3,900,787 | 8/1975 | Koster | 321/15 |
| 4,446,513 | 5/1984 | Clenet | 363/132 |
| 4,833,584 | 5/1989 | Divan | 363/37 |
| 4,939,633 | 7/1990 | Rhodes et al. | 363/98 |
| 5,063,488 | 11/1991 | Harada et al. | 363/16 |
| 5,162,984 | 10/1992 | Castagnet et al. | 363/143 |
| 5,200,887 | 4/1993 | Ioroi et al. | 363/143 |

Primary Examiner—Steven L. Stephan
Assistant Examiner—Adolf Berhane
Attorney, Agent, or Firm—Cesari and McKenna

[57] ABSTRACT

An inverter circuit configurable between 120 VAC output and 240 VAC output using the same components. The inverter is configured as two half bridges in parallel for 120 VAC and as a single full bridge for 240 VAC operation.

16 Claims, 4 Drawing Sheets

CONFIGURABLE INVERTER FOR 120 VAC OR 240 VAC OUTPUT

FIELD OF THE INVENTION

This invention is related generally to the field of power supply to electronic equipment, in particular, the supply of conditioned AC power for domestic or international operation at 120 VAC or 240 VAC respectively.

BACKGROUND OF THE INVENTION

Because electric power generally is available at 120 VAC domestically, but at 240 VAC in other countries, particularly European nations, electronic equipment used in those respective geographic locations are expected to have power requirements at those respective voltages. In turn, AC power supplies for power protection, such as the no-called "uninterruptible" power supply ("U.P.S."), generally must have the respective voltage output to service those geographic locations. As contemporary U.P.S. systems convert line AC to DC and then "rebuild" a "clean" AC signal using inverters, the inverters must provide either a 120 VAC or 240 VAC output in the respective geographic location.

Rather than have different designs for these inverters, adding to the cost of development, manufacturing and stocking, it is desirable to have DC/AC inverters that may be configured to either 120 VAC or 240 VAC operations with a minimum of change of components. Achievement of this goal also allows for field reconfiguration of the power supplies.

Two approaches have been explored to achieve this goal. The first approach, shown in FIG. 1, is a traditional full bridge inverter in which the DC voltage is supplied by a battery or DC storage capacitor 10, and a controller 20 signals switches 30 and 60 (typically MOSFETS) to open and close alternately with switches 40 and 50. The load 90 therefore sees a "full wave" AC signal, smoothed by inductor 70 and capacitor 80. Some fundamental equations governing the input/output relationship of this inverter are $$V_{out} = V_{in}(2D-1)$$

and $$VA_{out} = I_{orms} V_{orms}$$

where $V_{out}$ = instantaneous output voltage
$V_{in}$ = DC input voltage
D = duty cycle = time switches on/period
$VA_{out}$ = output volt amperes
$I_{orms}$ = RMS output current
$V_{orms}$ = RMS output voltage As evident from these relationships, to operate with both a 120 VAC and 240 VAC output voltage and produce the same VA, the inverter most generate twice as much current in the 120 VAC mode as in the 240 VAC mode. Thus, all components must be sized to handle the greater current seen during the 120 VAC operating mode. Second, because D is restricted to a value between 0 and 1, the DC input voltage input voltage must be greater than the peak of the AC output voltage plus some margin.

To operate in both modes, the 240 VAC (340 $V_{peak}$) mode defines the minimum DC input voltage. This is significant because, when operating at 120 VAC, the maximum duty cycle D will not approach 1, but will be significantly (20-30%) less. This means that the bridge switches must not only conduct greater currents at 120 VAC operation, but carry the current with less conduction time. This has a significant impact on the conduction losses in the bridge switches.

A second approach is depicted in FIG. 2. This method utilizes two half bridge inverters 200 and 250 with isolated sources 201 and 251, such that DC sources 202 and 252 respectively are connected to outputs 235 and 285 alternately with and in opposite polarity to sources 203 and 253, according to the alternate closing of switches 210 and 260 and of 211 and 261. For 120 VAC operation, outputs 235 and 285 are connected, and outputs 240 and 290 are connected to drive a load in parallel. For 240 VAC operation, outputs 240 and 285 are connected in a series connection, and the load is driven off outputs 235 and 290. The same equations set forth above for the first approach apply to each bridge section.

This second approach would allow each bridge to be optimized relative to input voltage and rms current stresses. However, the methods for controlling the output voltage and guaranteeing the equal share of power between the two bridges present a complex control problem. Moreover, it became apparent that different methods of control were required for each of the 120 VAC and 240 VAC modes of operation, defeating the goal of maximizing the commonality of control circuitry.

SUMMARY OF THE INVENTION

The invention described here solves the problem by configuring the inverter as two half bridges in parallel for 120 VAC and as a single full bridge for 240 VAC operation. In addition to this configuration change, the output inductor is designed as a coupled inductor whose windings are used to control current sharing between the two half bridges and is configured as a single inductor for full bridge operation.

The standard equations described above apply both to a half bridge and to a full bridge inverter. The only difference is that the input voltage $V_{in}$ for the half bridge is the voltage across one of the input sources (capacitors) rather than for both. Therefore $V_{in}$ would be one-half the value it would be for a full bridge. The significance is that the inverter for 120 VAC operation will not need to decrease its maximum duty cycle for the same DC input voltage applied to a full bridge. Therefore, this invention allows each half bridge to operate at one-half the total power and operate at near full duty cycle for 120 VAC operation. Thus, each half bridge is sized only to handle one-half the maximum rms output current for 120 VAC operation.

For 240 VAC operation, the two half bridges are reconfigured as a single full bridge. Again, because the output voltage has doubled, the maximum duty cycle remains the same as for 120 VAC half bridge operation. However, because of the higher output voltage, the rms output current for the full bridge configuration is one-half the total rms current for the paralleled half bridge. This implies that the total losses of the inverter do not change from 120 VAC to 240 VAC operation. Thus, the same MOSFET switches and other components may be used for both configurations.

Another important aspect of this invention is that for either mode of operation, the basic small signal transfer functions for control remain the same. This can be seen by reference to the small signal models discussed below for FIGS. 5A and 5B.

The invention allows precisely the same components to be used, with simple changes in jumper connections, in the 120 VAC or 240 VAC configurations and has been found to be feasible for outputs on the order of 4 KVA. Thus, the invention provides the maximum use of all components in the design under both operating conditions and requires manufacturing operations to build and stock only one type of inverter. Because of this, the invention provides the most cost effective solution and should have better cost/watt and watt/volume metrics than traditional approaches, certainly as compared to stocking two distinct converters.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
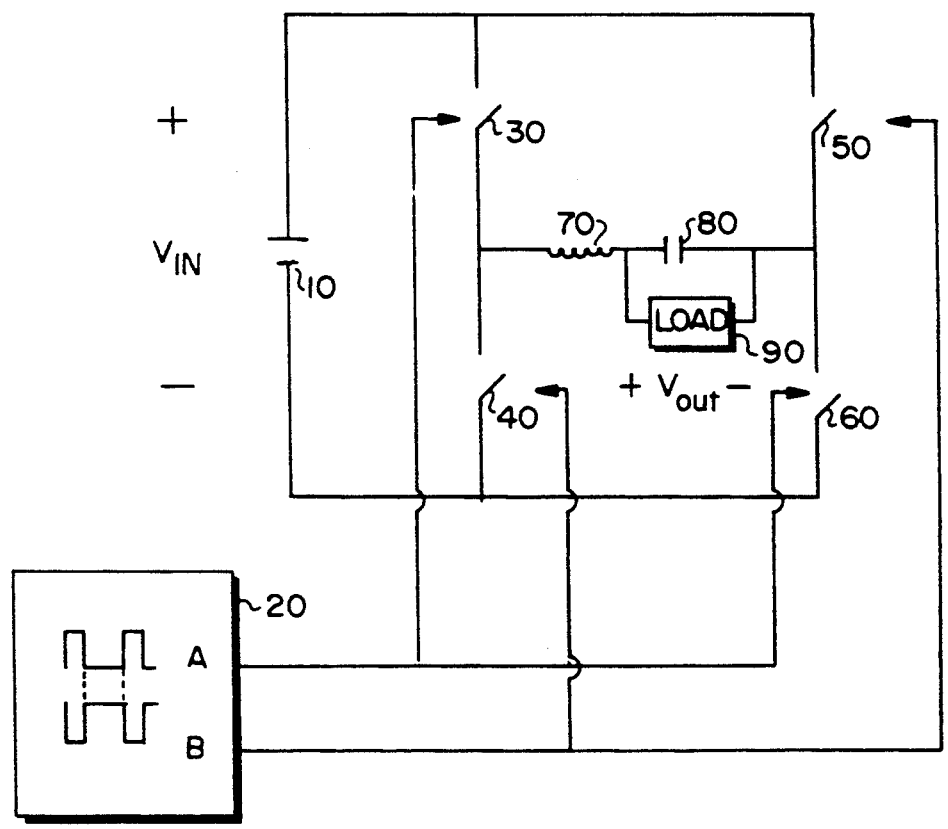
FIG. 1 shows a traditional full bridge inverter for illustration.
Figure 2:
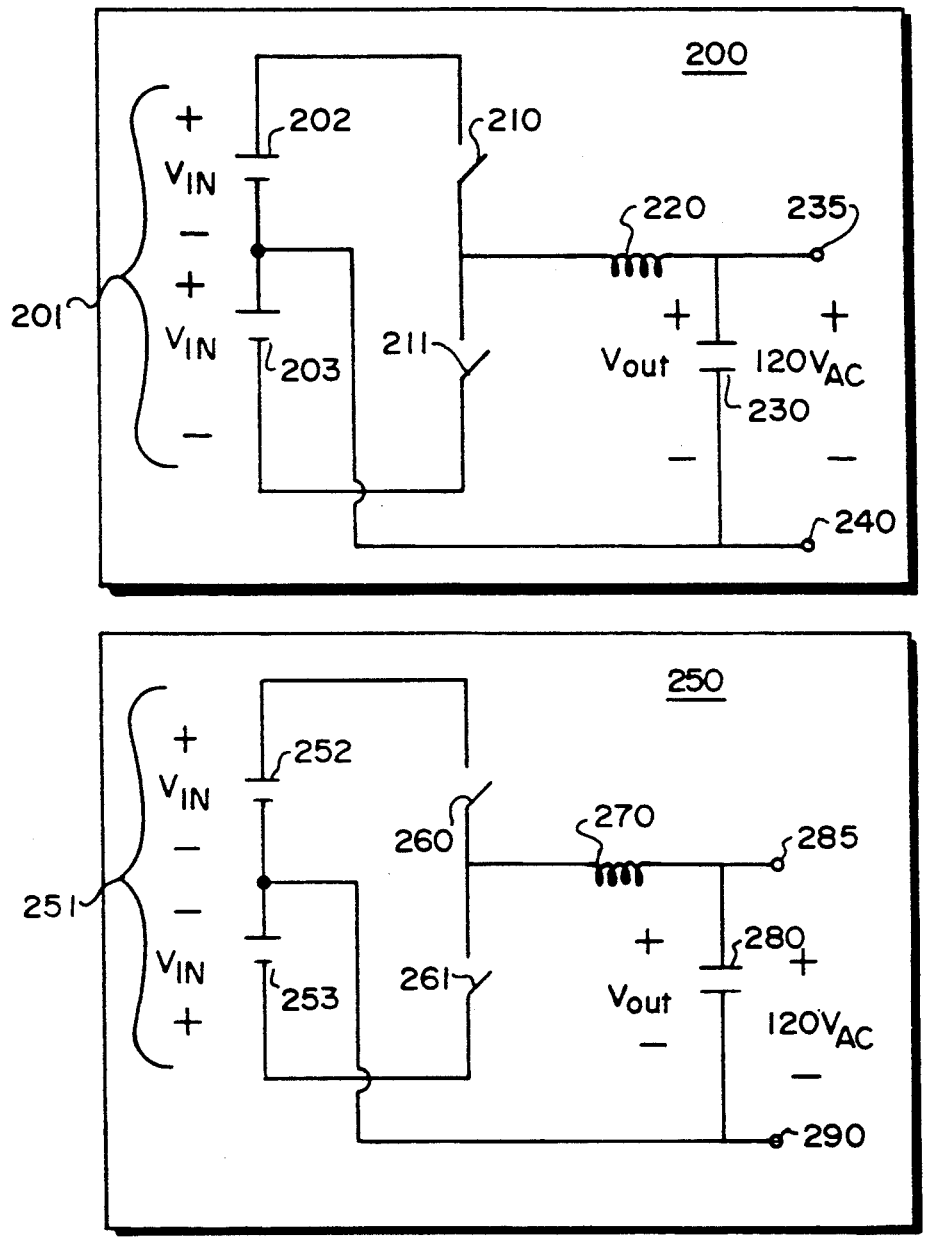
FIG. 2 shows a second approach to configurability of inverters for 120 VAC and 240 VAC output.
Figure 3A:
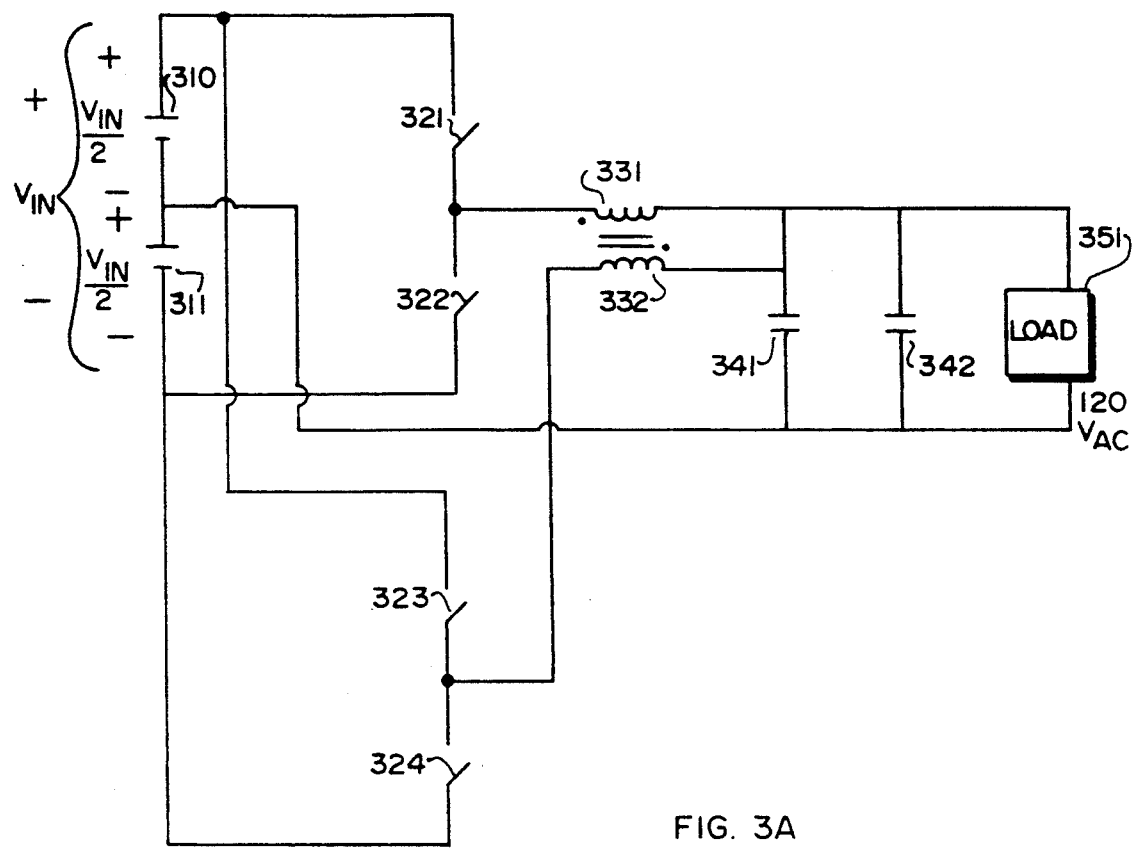
FIG. 3A shows the 120 VAC configuration of the illustrative embodiment.

FIG. 3A shows the inverter of this invention configured in the 120 VAC operating mode, that is, as two half bridges. Thus, in one half-cycle, DC source 310 is connected to load 351 and capacitors 341 and 342 (in parallel) through inductors 331 and 332 (in parallel) when switches 321 and 323 are closed and switches 322 and 324 are open. In the alternate half-cycle, DC source 311 is connected in the reverse polarity to load 351 and capacitors 341 and 342 through inductors 331 and 332 when switches 322 and 324 are closed and switches 321 and 323 are open. The switches in the illustrative embodiment are MOSFET gates that may be opened and closed using standard pulse width modulation techniques to variably gate current to build, for example, a sine wave (of one phase). Other gates may be used, as long as unidirectional gates allow current to flow in the direction from the positive to negative terminals of the DC sources, that is, in the direction from 310 through 321 through 322 to 311 and from 310 through 323 through 324 to 311, although current will never flow through gates on the same half-bridge (321 and 322; 323 and 324) during the same half-cycle.

The coupling between the inductors 331 and 332, which in the illustrative embodiment have the same number of turns (N), tends to assure that current is divided equally on the parallel paths, since applying Ampere's law, $I_{331}N = I_{332}N$. The sharing of the current flow on the parallel paths or half-bridges allows the selection of MOSFET switches (drivers), as well as other components, at lower power ratings.

Figure 3B:
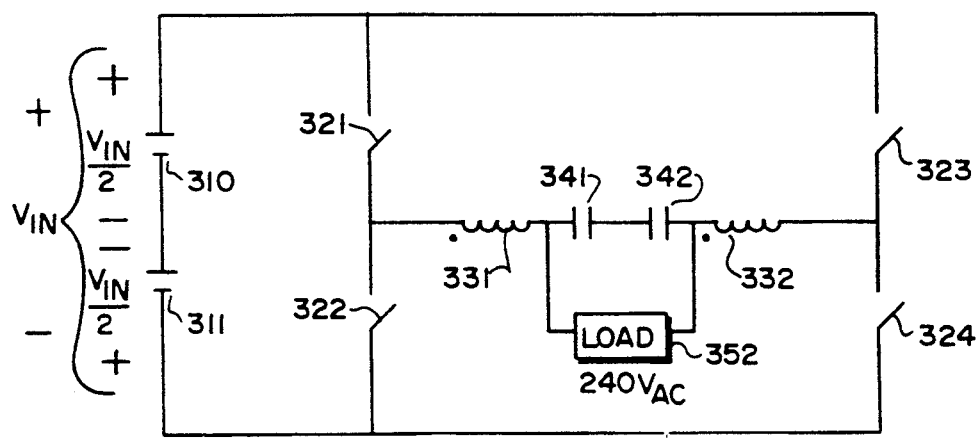
FIG. 3B shows the 240 VAC configuration of the illustrative embodiment.

FIG. 3B shows the inverter of this invention configured in the 240 VAC operating mode, that is, a full bridge. Thus, in one half-cycle, DC sources 310 and 311 in series are connected to load 352 and capacitors 341 and 342 (in series) through separate inductors 331 and 332 (in series) when switches 321 and 324 are closed and switches 322 and 323 are open. In the alternate half-cycle, DC sources 310 and 311 in series are connected in reverse polarity to load 352 and capacitors 341 and 342 through inductors 331 and 332 when switches 322 and 323 are closed and switches 321 and 324 are open.

Figure 4:
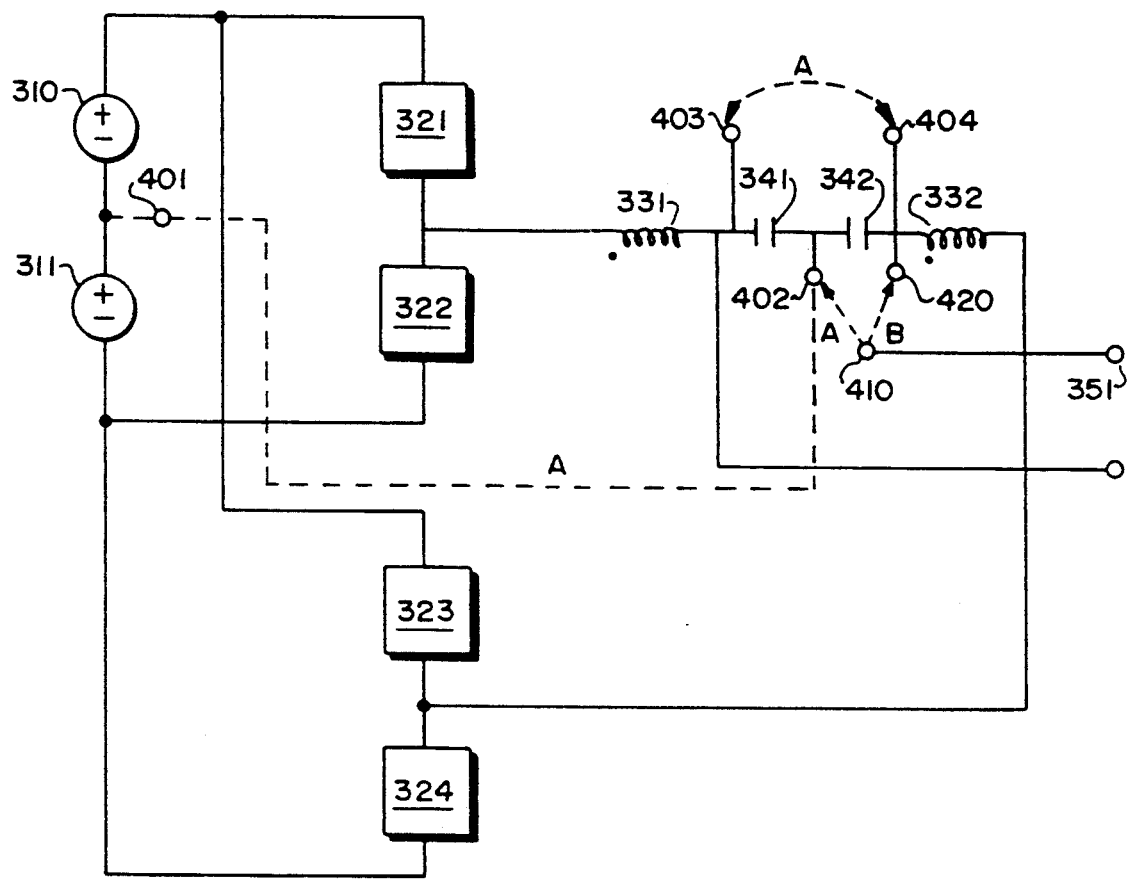
FIG. 4 shows an illustrative embodiment with the jumper connections required for conversion between 120 VAC and 240 VAC output.

The method of changing from one configuration to the other can be most easily accomplished by changing jumper wires to redirect switch control and to parallel or series the output inductor. This is the only change that is required. All components remain the same for both operations. Thus, FIG. 4 shows a simplified implementation of the invention on a 4 KVA DC/AC inverter. The DC voltage sources 310 and 311 correspond to the sources so labeled on FIGS. 3A and 3B, as do the other components. Switches 321, 322, 323, and 324 are shown as high voltage driver boxes. The inductor 331, the capacitors 341 and 342 and inductor 332 are arranged in series from a common output line from drivers 321 and 322 to a common output line from drivers 323 and 324. Jumper junctions 403, 402 and 404 (420) are provided between the inductors and capacitors. Outputs to load 351 are provided from a point between inductor 331 and capacitor 341 and from a jumper junction 410. When jumper junction 410 is connected to jumper junction 420 in the "B" connection, a full bridge is formed for 240 VAC output. If the jumper junction 410 is instead connected to jumper junction 402, jumper junction 402 connected to jumper junction 401 between the DC voltage sources 310 and 311, and jumper junction 403 connected to jumper junction 404 in the "A" connections, parallel half bridges are formed for 120 VAC output.

Figure 5A:
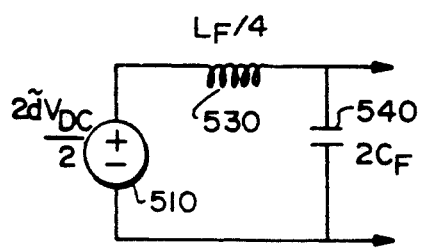
FIG. 5A shows the small signal model of the 120 VAC configuration of the illustrative embodiment.
Figure 5B:
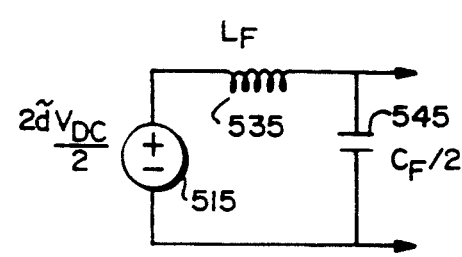
FIG. 5B shows the small signal model of the 240 VAC configuration of the illustrative embodiment.

FIGS. 5A and 5B respectively show the small signal models of the 120 VAC and 240 VAC configurations of the invention. In the figures, $L_F$ is the inductance of the inductors 331 and 332 in series, and $C_F$ is the capacitance of one of the capacitors 341 or 342. Because small signal source 510 in the 120 VAC parallel half bridge configuration drives in series two of the inductors in parallel and in shunt two of the capacitors in parallel, it drives series inductive load 530 that has inductance $L_F/4$ and shunt capacitive load 540 that has capacitance $2C_F$. Because small signal source 515 in the 240 VAC full bridge configuration drives in series two of the inductors in series and in shunt two of the capacitors in series, it drives series inductive load 535 that has inductance $L_F$ and shunt capacitive load 545 that has capacitance $C_F/2$. The products of these impedances are identical, resulting in the same small signal transfer function.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A DC to AC inverter circuit configurable for output either at a first AC voltage level or, alternatively, at a second AC voltage level half the first level, said inverter circuit comprising:
   A) two substantially identical DC sources connected in series to present a positive terminal and a negative terminal;
   B) a first switch connected to the positive terminal of said series-connected DC sources;
   C) a second switch connected in series to said first switch and to the negative terminal of said series-connected DC sources;
   D) a third switch connected to the positive terminal of said series-connected DC sources;
   E) a fourth switch connected in series to said third switch and to the negative terminal of said series-connected DC sources;
   F) a first inductor connected to the connection between said first and second switches;
   G) two substantially identical capacitors connected in series to said first inductor at the port of said first inductor remote from the connection between said first and second switches;
   H) a second inductor substantially identical to said first inductor connected in series to said series-connected capacitors remote from said first inductor and connected to the connection between said third and fourth switches; and
   I) one AC output at the connection between said first inductor and said series-connected capacitors; wherein
   J) said inverter circuit is configurable either
      i) for output at said first AC voltage level, by (a) opening and closing said first and third switches in unison alternately with opening and closing said second and fourth switches in unison at a desired AC cycle; and (b) taking a second AC output from the connection between said second inductor and said series-connected capacitors; or, alternatively,
      ii) for output at said second AC voltage level, by (a) connecting the connection between said series-connected capacitors to the connection between said series-connected DC sources; (b) connecting the connection between said first inductor and said series-connected capacitors to the connection between said second inductor and said series-connected capacitors; (c) opening and closing said first and fourth switches in unison alternately with opening and closing said second and third switches at a desired AC cycle; and (d) taking a second AC output from the connection between said series-connected capacitors.

2. The inverter of claim 1 wherein said first, second, third, and fourth switches are MOSFET switches.

3. The inverter of claim 1 wherein the "connecting" recited in clauses (J)(ii)(a) and (J)(ii)(b) is made by jumper connection.

4. A DC to AC inverter circuit configurable for output either at a first AC voltage level or, alternatively, at a second AC voltage level half the first level, said inverter circuit comprising:
   A) two substantially identical DC sources connected in series to present a positive terminal and a negative terminal;
   B) a first half-bridge comprising:
      i) a first switch connected to the positive terminal of said series-connected DC sources; and
      ii) a second switch connected in series to said first switch and to the negative terminal of said series-connected DC sources;
   C) a second half-bridge comprising:
      i) a third switch connected to the positive terminal of said series-connected DC sources; and
      ii) a fourth switch connected in series to said third switch and to the negative terminal of said series-connected DC sources; and
   D) one AC output from the connection between said first and second switches; wherein
   E) said inverter circuit is configurable either
      i) for output at said first AC voltage level, by (a) opening and closing said first and third switches in unison alternately with opening and closing said second and fourth switches in unison at a desired AC cycle; and (b) taking a second AC output from the connection between said third and fourth switches to form a full bridge; or, alternatively,
      ii) for output at said second AC voltage level, by (a) connecting the connection between said first and second switches to the connection between said third and fourth switches to form parallel half-bridges; (b) opening and closing said first and fourth switches in unison alternately with opening and closing said second and third switches in unison at a desired AC cycle; and (c) taking a second AC output from the connection between said series-connected DC sources.

5. The inverter of claim 4 wherein said first, second, third, and fourth switches are MOSFET switches.

6. The inverter of claim 4 wherein the "connecting" recited in clause (E)(ii)(a) is made by jumper connection.

7. The inverter of claim 4 further comprising means for balancing current passing through said switches.

8. The inverter of claim 7 wherein said balancing means comprises parallel, matched and inductively coupled inductors placed between each of said connections between said first and second switches and third and fourth switches for output at said second AC voltage level.

9. A DC to AC inverter circuit configurable for output either at a first AC voltage level or, alternatively, at a second AC voltage level half the first level, said inverter circuit comprising:
   A) two substantially identical DC sources connected in series to present a positive terminal and a negative terminal;
   B) a first half-bridge comprising:
      i) a first switch connected to the positive terminal of said series-connected DC sources;
      ii) a second switch connected in series to said first switch and to the negative terminal of said series-connected DC sources; and
      iii) a first inductor connected to the connection between said first and second switches;
   C) a second half-bridge comprising:
      i) a third switch connected to the positive terminal of said series-connected DC sources;
      ii) a fourth switch connected in series to said third switch and to the negative terminal of said series-connected DC sources; and iii) a second inductor connected to the connection between said third and fourth switches; and D) one AC output at the end of said first inductor remote from the connection between said first and second switches; wherein E) said inverter circuit is configurable either
  i) for output at said first AC voltage level, by (a) opening and closing said first and third switches in unison alternately with opening and closing said second and fourth switches in unison at a desired AC cycle; and (b) taking a second AC output from the end of said second inductor remote from the connection between said third and fourth switches to form a full bridge; or, alternatively,
  ii) for output at said second AC voltage level, by (a) connecting the end of said first inductor remote from the connection between said first and second switches to the end of said second inductor remote from the connection between said third and fourth switches to form parallel half-bridges; (b) opening and closing said first and fourth switches in unison alternately with opening and closing said second and taking a second AC output from the connection between said series-connected DC sources.

10. The inverter of claim 9 wherein said first and second inductors are substantially identical and arranged in parallel and inductively coupled for output at said second AC voltage level.

11. The inverter of claim 9 wherein said first, second, third, and fourth switches are MOSFET switches.

12. The inverter of claim 9 wherein the "connecting" recited in clause (E)(ii)(a) is made by jumper connection.

13. A DC to AC inverter circuit configurable for output either at a first AC voltage level or, alternatively at a second AC voltage level half the first level, said inverter circuit comprising:

A) two substantially identical DC sources connected in series;

B) a first half-bridge comprising:
  i) a first switch connected to the positive terminal of said series-connected DC sources;
  ii) a second switch connected in series to said first switch and to the negative terminal of said series-connected DC sources; and
  iii) a first capacitor connected to the connection between said first and second switches;

C) a second half-bridge comprising:
  i) a third switch connected to the positive terminal of said series-connected DC sources;
  ii) a fourth switch connected in series to said third switch and to the negative terminal of said series-connected DC sources; and
  iii) a second capacitor connected to the connection between said third and fourth switches;

D) a connection between the end of said first capacitor remote from the connection between said first and second switches and the end of said second capacitor remote from the connection between said third and fourth switches; and E) one AC output at the connection between said first and second switches; wherein F) said inverter circuit is configurable either
  i) for output at said first AC voltage level, by (a) opening and closing said first and third switches in unison alternately with opening and closing said second and fourth switches in unison at a desired AC cycle; and (b) taking a second AC output from the connection between said third and fourth switches to form a full bridge; or, alternatively,
  ii) for output at said second AC voltage level, by (a) connecting the connection between said first and second switches to the connection between said third and fourth switches to form parallel half-bridges; (b) opening and closing said first and fourth switches in unison alternately with opening and closing said second and third switches in unison at a desired AC cycle; (c) connecting the connection between said first and second capacitors to the connection between said series-connected DC sources; and (c) taking a second AC output from the connection between said series-connected DC sources.

14. The inverter of claim 13 wherein said first, second, third, and fourth switches are MOSFET switches.

15. The inverter of claim 13 wherein the "connecting" recited in clauses (F)(ii)(a) and (F)(ii)(c) is made by jumper connection.

16. The inverter of claim 13 further comprising means for balancing current passing through said switches.

* * * * *